(12) United States Patent
Herskedal et al.

(10) Patent No.: US 8,001,311 B2
(45) Date of Patent: Aug. 16, 2011

(54) SIMULATION OF SMARTCARD REMOVAL AND REINSERTION

(75) Inventors: Eirik Herskedal, Issaquah, WA (US); Eliyas Yakub, Issaquah, WA (US); Doron J. Holan, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 702 days.

(21) Appl. No.: 12/163,646

(22) Filed: Jun. 27, 2008

(65) Prior Publication Data

US 2009/0328076 A1 Dec. 31, 2009

(51) Int. Cl.
*G06F 13/00* (2006.01)
*G06F 3/00* (2006.01)

(52) U.S. Cl. ............... 710/301; 710/8; 710/72; 719/321

(58) Field of Classification Search .......... 710/301–302, 710/8–14, 72–74; 719/321; 235/380
See application file for complete search history.

(56) References Cited

U.S. PATENT DOCUMENTS

| | | | |
|---|---|---|---|
| 6,178,468 B1 | 1/2001 | Rudd et al. | |
| 6,345,319 B2 | 2/2002 | Lin et al. | |
| 6,711,630 B2 | 3/2004 | Dubal et al. | |
| 6,745,247 B1* | 6/2004 | Kawan et al. | 709/245 |
| 6,779,064 B2* | 8/2004 | McGowen et al. | 710/104 |
| 6,785,894 B1* | 8/2004 | Ruberg | 719/321 |
| 6,898,653 B2 | 5/2005 | Su et al. | |
| 7,096,473 B2* | 8/2006 | Ruget et al. | 719/321 |
| 7,284,083 B2 | 10/2007 | Oshins et al. | |
| 7,308,511 B2* | 12/2007 | Wilson et al. | 710/8 |
| 7,698,122 B2* | 4/2010 | Chrysanthakopoulos | 703/24 |
| 7,945,710 B2* | 5/2011 | Lu et al. | 710/15 |
| 2002/0080190 A1* | 6/2002 | Hamann et al. | 345/810 |
| 2002/0152456 A1* | 10/2002 | Nightingale et al. | 717/135 |
| 2002/0161933 A1* | 10/2002 | Shanthaveeraiah et al. | 709/328 |
| 2003/0233487 A1* | 12/2003 | Ruget et al. | 709/321 |
| 2004/0205258 A1* | 10/2004 | Wilson et al. | 710/1 |
| 2005/0066158 A1* | 3/2005 | Mowery et al. | 713/2 |
| 2005/0257226 A1 | 11/2005 | Belvin et al. | |
| 2006/0097040 A1* | 5/2006 | Castillo et al. | 235/380 |
| 2006/0168372 A1 | 7/2006 | Smith, IV et al. | |
| 2007/0276966 A1 | 11/2007 | Paul et al. | |
| 2008/0041931 A1 | 2/2008 | Lu et al. | |
| 2009/0328179 A1* | 12/2009 | Herskedal et al. | 726/9 |

FOREIGN PATENT DOCUMENTS

EP 1890426 2/2008

OTHER PUBLICATIONS

"E-Gate USB Smart Card", retrieved at <<http://www.reflexreaders.com/Support/Downloads/egate_W2K_README.pdf>>, Schlumberger, Dec. 19, 2003, pp. 1-10.
"How to Send IOCTLs to a Filter Driver", retrieved on Apr. 21, 2008 at <<http://support.microsoft.com/kb/262305>>, Microsoft, Article ID 26305, Revision 3.1, Aug. 4, 2005, pp. 1-13.
"Smart Card Driver IOCTLs", retrieved on Apr. 21, 2008 at <<http://msdn2.microsoft.com/en-us/library/ms896215.aspx>>, Microsoft, p. 1.

* cited by examiner

*Primary Examiner* — Christopher B Shin
(74) *Attorney, Agent, or Firm* — Lee & Hayes, PLLC

(57) ABSTRACT

A filter driver may be instantiated in a smartcardreader class, and used to modify the smartcard status in an operating system.

20 Claims, 4 Drawing Sheets

SIMULATION OF SMARTCARD REMOVAL AND REINSERTION

BACKGROUND

Smartcards are portable devices that include an embedded integrated circuit. Smartcards may be passive memory devices or contain a microcontroller and associated memory for various functions. Smartcard form factors include plastic cards, fobs, subscriber identification modules (SIMs), and the like.

Applications for smartcards include payment systems, access control, identification, cryptographic controls and authentication, and telecommunications.

Following installation of necessary driver software or support applications or both, or during regular use, a smartcard may not be fully installed or recognized. This condition may require a user to physically remove and reinstall the smartcard to bring the card to full functionality within the system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary methods and systems for simulating a smartcard removal and reinstallation.

In an exemplary implementation, after plug and play ("PnP") enumeration and installation of a smartcard, a smartcard plug and play service issues a request to an upper-level class filter driver ("filter driver") which modifies the smartcard status, indicating to a smartcard service that the card has been removed. The smartcard which has remained in the smartcard reader is then re-recognized as if it had been removed and reinserted.

Use of an upper-level class filter allows the seamless addition of this functionality to an existing operating system without adversely affecting legacy drivers or applications.

An exemplary system described includes a processor and memory, and is configured to utilize a filter driver to modify the smartcard status and effect the simulated removal.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
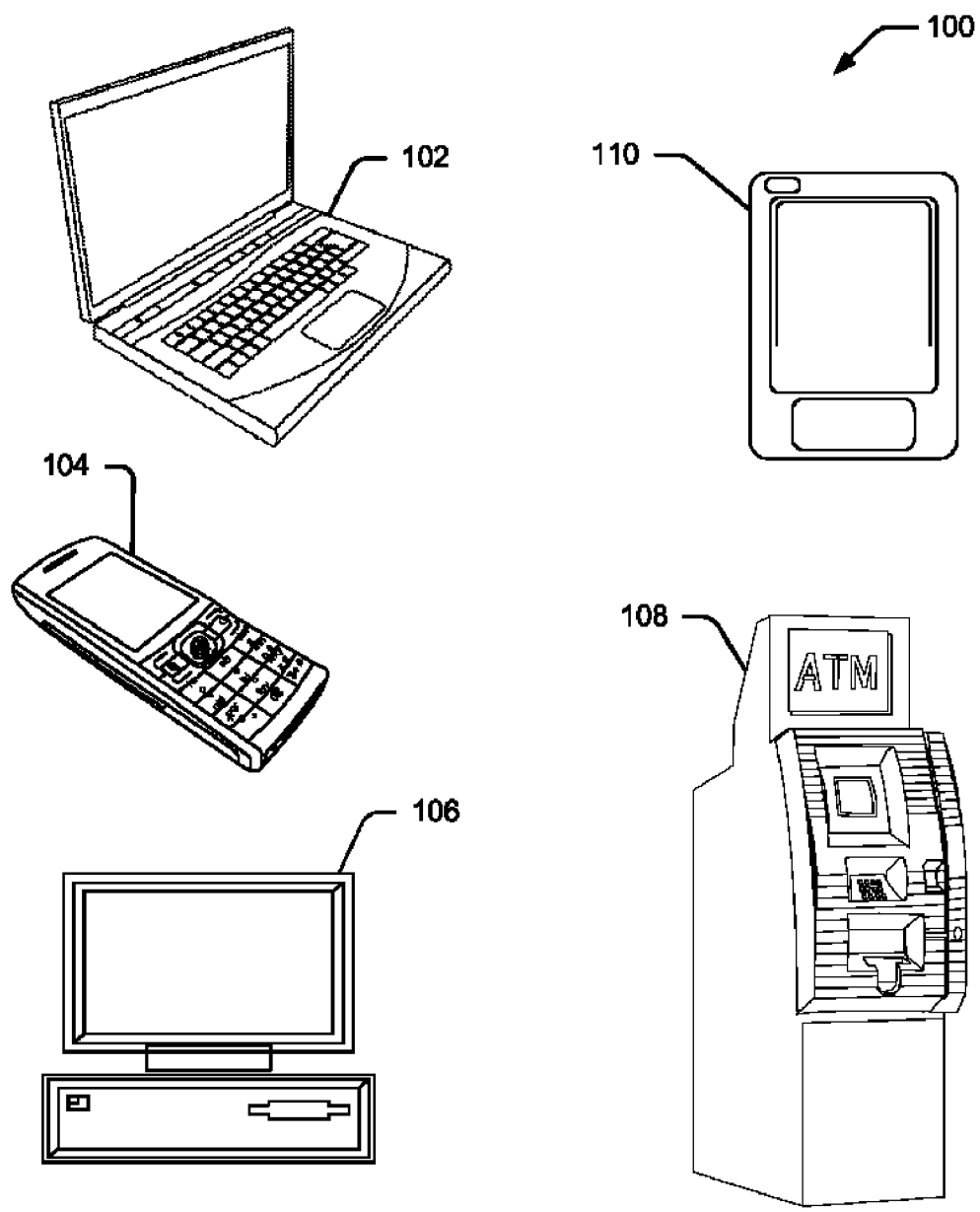
FIG. 1 shows exemplary devices utilizing a simulated smartcard removal and reinsertion.

FIG. 1 shows exemplary devices 100 which may utilize a simulated smartcard removal in an operating system. These devices may include, but are not limited to, a laptop computer 102, a cellular phone 104, a desktop computer 106, an automated teller machine (ATM) 108 or point of sale device, a personal digital assistant (PDA) 110, and the like. It is understood that devices utilizing an operating system implementing a filter driver and a smartcard or subscriber information module (SIM) may benefit from this invention.

Figure 2:
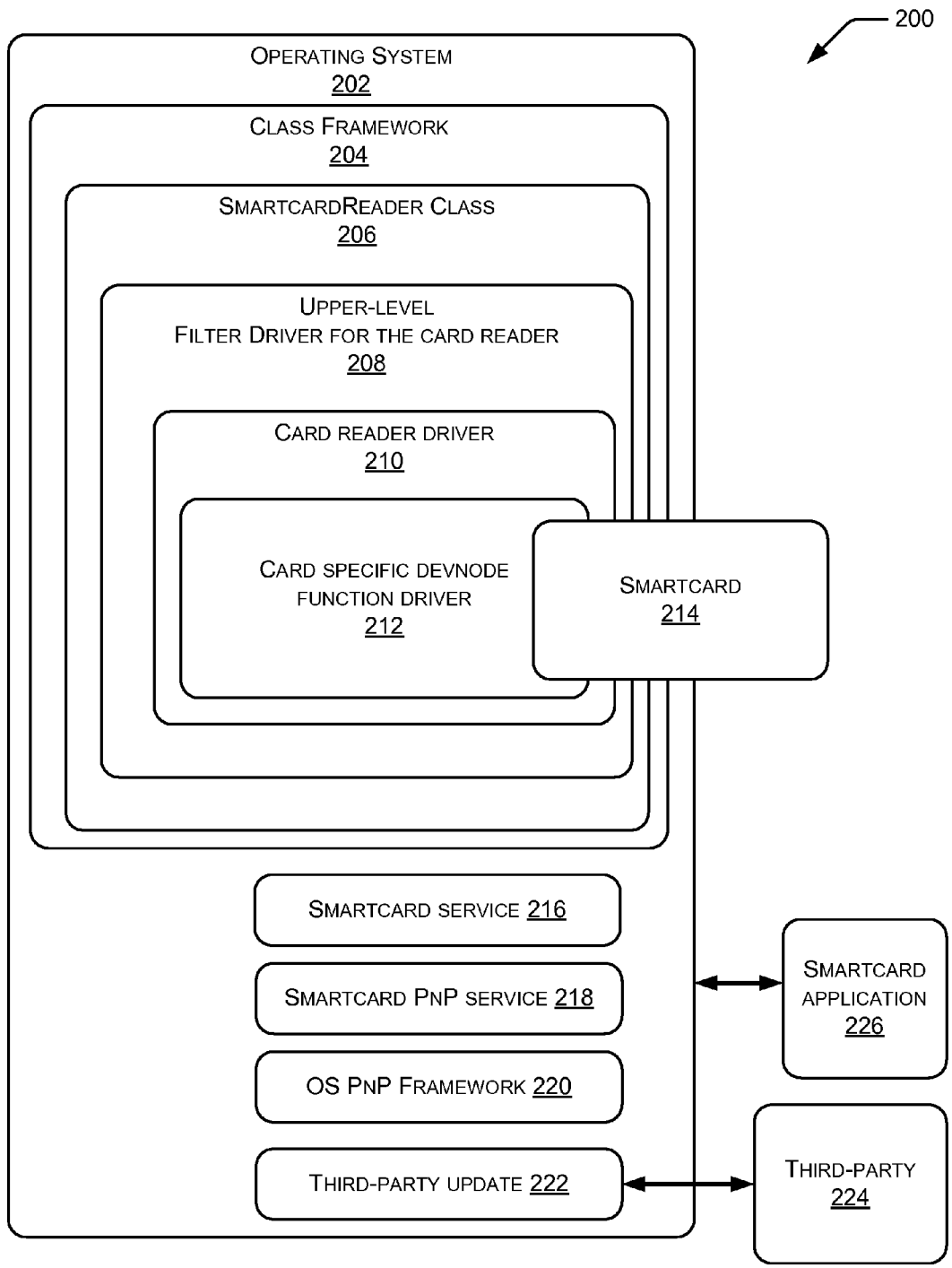
FIG. 2 is a schematic diagram showing an exemplary system to implement simulated smartcard removal and reinsertion in an operating system.

FIG. 2 is a schematic diagram 200 showing an exemplary system implementing a simulated smartcard removal in an operating system. Depicted is an operating system 202. Exemplary operating systems include, but are not limited to, members of the Microsoft Windows™ family including Windows 2000™, Windows XP™, Windows Vista™, Windows Mobile®, as well as other operating system families including Linux and its derivatives, Mac OS™, AIX™, and the like.

Within operating system 202 is a class framework 204, which provides a hierarchy of component objects. The class framework provides for various classes of objects present in the system including monitors, human interface devices, networks adapters, smartcards, and the like.

Within the class framework 204 is a smartcardreader class 206. In keeping with the class framework hierarchy, properly enumerated smartcards manifest under the smartcardreader class 206.

Within the smartcardreader class 206 is an upper-level filter driver 208, typically operating in kernel mode. An upper-level filter driver ("filter driver") is a driver that modifies and extends the behavior of subordinate objects. Because a filter driver provides this ability to modify behavior of subordinate objects while continuing to pass through commands, it is an ideal way to seamlessly add functionality without affecting legacy software.

The upper-level filter driver 208 encompasses card reader driver 210. Therefore, in the exemplary system, the filter driver 208 modifies the behavior of the subordinate card reader driver 210 and its subordinates. However, no modification to card reader driver 210 or the card reader driver's subordinates takes place.

Within card reader driver 210 is a card specific device node ("devnode") function driver 212. A devnode is an operating system internal structure that represents a device on a computer system. The card specific devnode function driver 212 enables the full functionality of a specific smartcard 214 within the operating system 202.

Within operating system 202 is also a smartcard service 216, which manages the smartcard resources. In Microsoft Windows™ an example of a smartcard service is the SCardSvr service which may run inside a SVCHost, also known as a smartcard resource manager. The smartcard service provides the basic infrastructure utilized by other smartcard components, and manages a smartcard reader on a system and its application interactions. Within Microsoft Windows™, the smartcard resource manager (also abbreviated "SCRM") may be implemented as a shared service running in the context of a Local Service.

Also within operating system 202 is a smartcard plug and play service 218. The smartcard plug and play service may operate a user mode and is responsible for managing and communicating with the filter driver to create the devnode for the smartcard. The functionality to create a devnode may be present in the reader driver or the filter driver.

Within operating system 202 is also the operating system plug and play framework 220 which detects a devnode, and may also install appropriate driver, or application software, or both, necessary to render the smartcard fully functional.

A third party update 222 is also present in the operating system, which works in conjunction with the operating system plug and play framework 220 to communicate to a third-party 224 via a communication link to retrieve appropriate drivers, or application software, or both, necessary for the card to function properly. One example includes, but is not limited to, the Microsoft™ Windows™ Update. Microsoft™ Windows™ Update is a service which enables users to connect to a source (typically centralized and trusted) and download compliant drivers, or support software, or both, necessary to enable full plug and play functionality of installed devices with minimal user intervention.

The operating system 202 and its components, both inherent and those specified above, may communicate with the smartcard application 226. Smartcard applications may include displaying available balance information in a stored-value smartcard, storing or retrieving medical data to the card, and the like. Alternatively, the smartcard application 226 may be present within operating system 202 as an operating system component, such as a cryptographic service provider (CSP), or have components present both within the operating system as well as in an application space.

Figure 3:
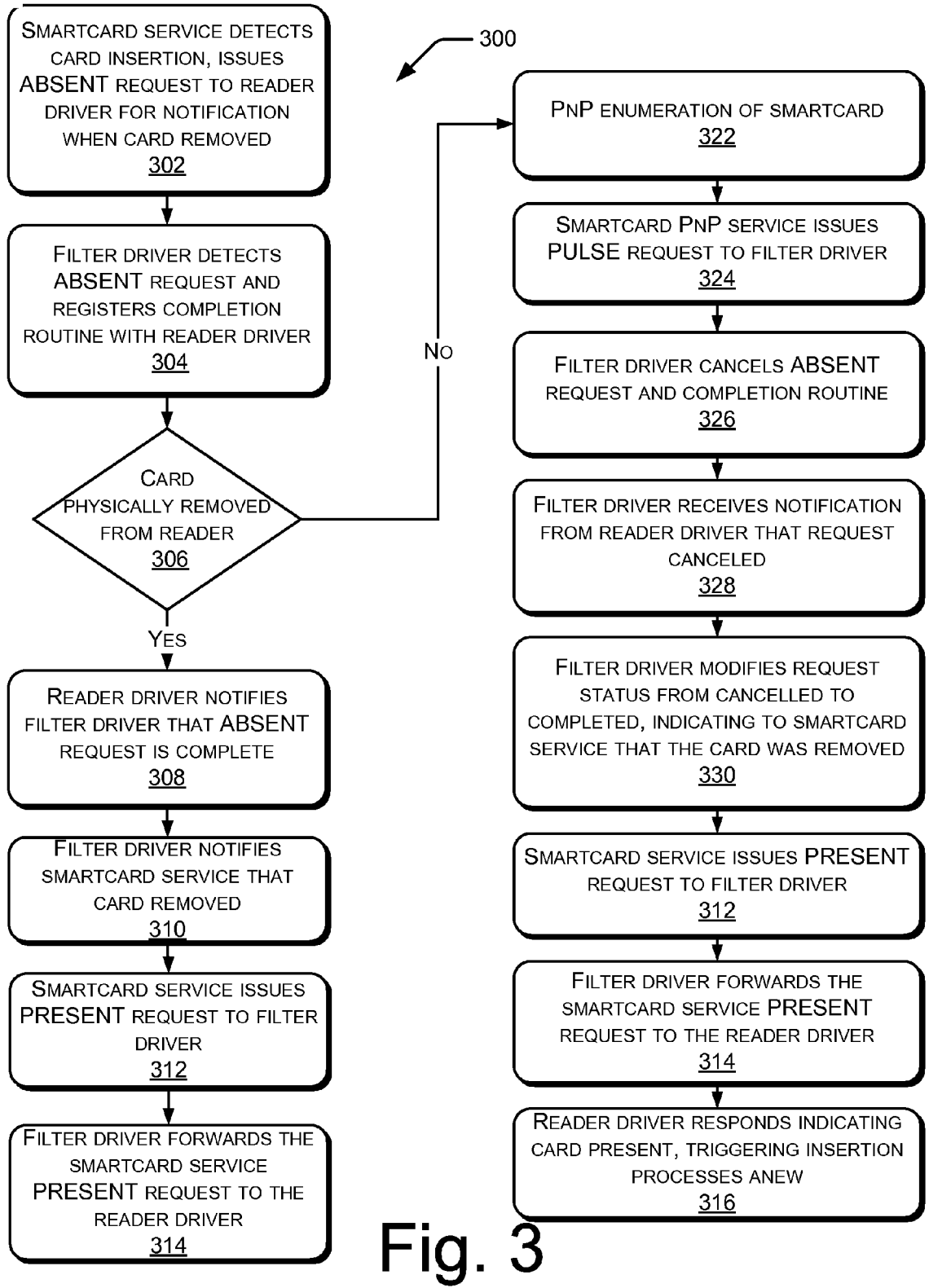
FIG. 3 is an exemplary flow diagram of one implementation of simulating a smartcard removal.

FIG. 3 is an exemplary flow diagram of one implementation of simulating a smartcard removal in an operating system 300. For simplicity, the process will be described with reference to the exemplary computer system 200 described above with reference to FIG. 2. Although specific details of exemplary method are described below, it should be understood that certain acts need not be performed in the order described, and may be modified, or may be omitted entirely, or both, depending on the circumstances. Moreover, the acts described may be implemented by a computer, processor or other computing device based on instructions stored on one or more computer-readable storage media. The computer-readable storage media may be any available media that may be accessed by a computing device to implement the instructions stored thereon.

At 302, a smartcard service 216 detects the smartcard 214 insertion event. An insertion event may be the actual physical insertion of a smartcard, establishing a connection between a smartcard and a smartcard reader via a wireless connection (wireless including, but not limited to, infrared and radio frequency), or remotely through redirection at a remote terminal, or re-discovery of a smartcard in a reader following simulated removal. The smartcard service 216 issues an ABSENT request to the smartcard reader driver 210, seeking notification when the smartcard 214 is removed. In the Windows™ environment, the ABSENT request may be implemented as an IOCTL_SMARTCARD_ABSENT request.

At 304, the filter driver 208 detects the ABSENT request, and registers a completion routine with the reader driver 210. A completion routine configures the system to notify the filter driver 208 when the ABSENT request passes through the system next.

At 306, for clarity in describing the exemplary method showing a determination as to whether the smartcard has been physically removed from the reader, however this determination may be omitted. Physical removal is described next, followed by simulated removal.

At 308, it has been determined that the smartcard 214 has been physically removed from the reader. Due to the completion routine registered with the reader driver 210 in 304, the reader driver 210 notifies the filter driver 208 that the ABSENT request is complete.

At 310, the filter driver 208 then notifies the smartcard service 216 that the smartcard 214 has been removed.

At 312, the smartcard service 216 issues a PRESENT request to the filter driver 208. In the Windows™ environment, the PRESENT request may be implemented as an IOCTL_SMARTCARD_PRESENT request. The PRESENT request triggers generation of a notification when a smartcard 214 is next connected to the smartcard reader.

At 314, the filter driver 208 then forwards the PRESENT request from the smartcard service 216 to the reader driver 210. The reader driver 210 then waits, with the PRESENT request, for the next smartcard insertion event, which returns to block 302 and triggers the discovery anew.

Returning to 306 and the situation where the smartcard has not been removed, at 322 plug and play enumeration of the smartcard takes place. At 324, following this enumeration, a smartcard plug and play service 218 may issue a PULSE request to the filter driver 208. In the Windows™ environment, the PULSE request may be implemented as an IOCTL_SCPNP_PULSE_CARD request.

At 326, the filter driver 208 receives this PULSE request, and cancels the pending ABSENT request and associated completion routine with the reader driver 208.

At 328, the filter driver 208 receives notification from the reader driver 210 that the request has been canceled.

At 330, the filter driver 208 modifies the smartcard request status from "cancelled" to "completed" (or the like) indicating to the smartcard service 216 that the smartcard 214 was physically removed, even while it remains physically connected to the reader. It is also possible in the alternative to queue an ABSENT request in the filter driver instead of modifying the smartcard request status. A second ABSENT request would then be issued from the filter driver to the reader driver (for example, with the same IOCTL). To simulate smartcard removal, the second ABSENT request is canceled and the original ABSENT request completes its notification, whereupon the smartcard service now believes the card is absent, and then sends down a PRESENT request.

At 312, the smartcard service 216 issues a PRESENT request to the filter driver 208.

At 314, the filter driver 208 forwards the smartcard service's 216 PRESENT request to the reader driver 210.

At 316, the reader driver 210 receives the PRESENT request from the smartcard service 216, and responds with an indication that the smartcard 214 is present, returning to block 302 and triggering the discovery process anew.

Another embodiment places the functionality to simulate the removal and reinsertion at the reader driver, rather than at the filter driver as described above.

Figure 4:
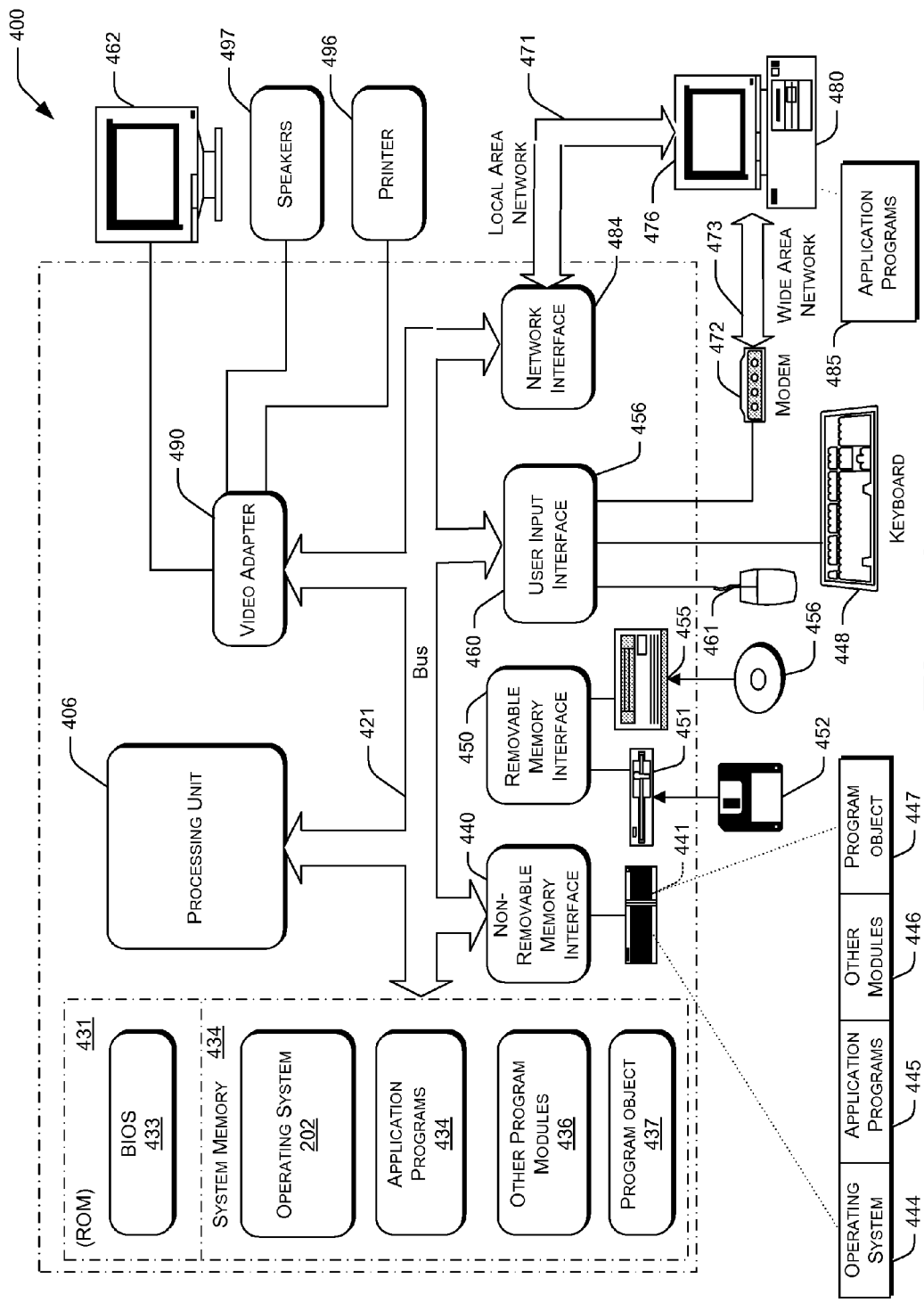
FIG. 4 is a schematic diagram showing an exemplary computing system suitable as an environment for practicing aspects of the subject matter.

FIG. 4 shows an exemplary computing system 400 suitable as an environment for practicing aspects of the subject matter, for example to host an exemplary operating system 202. The components of computing system 400 may include, but are not limited to, a processing unit 406, a system memory 430, and a system bus 421 that couples various system components including the system memory 430 and the processing unit 406. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as the Mezzanine bus, Serial Advanced Technology Attachment (SATA), PCI Express, Hypertransport™, and Infiniband.

Exemplary computing system 400 typically includes a variety of computing device-readable storage media. Computing device-readable storage media may be any available media that can be accessed by computing system 400 and includes both volatile and nonvolatile media, removable and non-removable media. By way of example, and not limitation, computing device-readable media may comprise computing device storage media and communication media. Computing device storage media include volatile and nonvolatile, removable and non-removable media implemented in any method or technology for storage of information such as computing device-readable instructions, data structures, program modules, or other data. Computing device storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other computer readable storage medium which can be used to store the desired information and which can be accessed by computing system 400. Communication media typically embodies computing device-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 430 includes or is associated with computing device storage media in the form of volatile or nonvolatile memory such as read only memory (ROM) 431 and random access memory (RAM), or both. A basic input/output system 433 (BIOS), containing the basic routines that help to transfer information between elements within computing system 400, such as during start-up, is typically stored in ROM 431. RAM system memory 430 typically contains data or program modules or both that are immediately accessible to or presently being operated or both on by processing unit 406. By way of example, and not limitation, FIG. 4 illustrates operating system 435, application programs 434, other program modules 436, and program data 437. Although the exemplary operating system 202 is depicted as software in random access memory 430, other implementations of an operating system 202 can be hardware or combinations of software and hardware.

The exemplary computing system 400 may also include other removable/non-removable, volatile/nonvolatile computing device storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface such as interface 450.

The drives and their associated computing device storage media discussed above and illustrated in FIG. 4 provide storage of computing device-readable instructions, data structures, program modules, and other data for computing system 400. In FIG. 4, for example, hard disk drive 441 is illustrated as storing operating system 444, application programs 1545, other program modules 446, and program data 447. Note that these components can either be the same as or different from operating system 435, application programs 434, other program modules 436, and program data 437. Operating system 444, application programs 445, other program modules 446, and program data 447 are given different numbers here to illustrate that, at a minimum, they are different copies. A user may enter commands and information into the exemplary computing system 400 through input devices such as a keyboard 448 and pointing device 461, commonly referred to as a mouse, trackball, or touch pad. Other input devices (not shown) may include a microphone, joystick, game pad, satellite dish, scanner, or the like. These and other input devices are often connected to the processing unit 406 through a user input interface 460 that is coupled to the system bus, but may be connected by other interface and bus structures, such as a parallel port, game port, or a universal serial bus (USB). A monitor 462 or other type of display device is also connected to the system bus 421 via an interface, such as a video interface 490. In addition to the monitor 462, computing devices may also include other peripheral output devices such as speakers 1597 and printer 496, which may be connected through an output peripheral interface 495.

The exemplary computing system 400 may operate in a networked environment using logical connections to one or more remote computing devices, such as a remote computing device 480. The remote computing device 480 may be a personal computing device, a server, a router, a network PC, a peer device or other common network node, and typically includes many or all of the elements described above relative to computing system 400, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computing device networks, intranets, and the Internet.

When used in a LAN networking environment, the exemplary computing system 400 is connected to the LAN 471 through a network interface or adapter 470. When used in a WAN networking environment, the exemplary computing system 400 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the exemplary computing system 400, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computing devices may be used.

Although specific details of exemplary methods are described with regard to the figures presented herein, it should be understood that certain acts shown in the figures need not be performed in the order described, and may be modified, or may be omitted entirely, or both, depending on the circumstances. Moreover, the acts described may be implemented by a computer, processor or other computing device based on instructions stored on one or more computer-readable storage media. The computer-readable media can be any available storage media that can be accessed by a computing device to implement the instructions stored thereon.

CONCLUSION

Although exemplary systems and methods have been described in language specific to structural features or methodological acts, or both, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method for simulating smartcard removal and reinsertion in a smartcard reader, the method comprising:
   connecting a smartcard to a smartcard reader in an insertion event;
   detecting the insertion event in a smartcard service and issuing an ABSENT request to a reader driver for notification upon smartcard removal;
   detecting the ABSENT request in a filter driver and registering a completion routine with the reader driver;
   issuing a PULSE request from the smartcard plug and play service to the filter driver;
   utilizing the filter driver to cancel the ABSENT request;
   receiving at the filter driver notification from the reader driver that the ABSENT request has been canceled;
   modifying the request status from cancelled to completed at the filter driver and indicating to the smartcard service that the smartcard was removed;
   issuing a PRESENT request from the smartcard service to the filter driver;
   forwarding the smartcard service PRESENT request from the filter driver to the reader driver; and
   triggering the reader driver to indicate a smartcard is present.

2. One or more computer readable storage media comprising executable instructions that, when executed, direct a computing system to perform the method recited in claim 1.

3. The method of claim 1, further comprising:
   determining that the smartcard must be removed and reinstalled to complete installation in the operating system; and
   issuing the PULSE request to the filter driver.

4. A method comprising:
   instantiating a driver in a smartcardreader class;
   connecting a smartcard and a smartcard reader in an insertion event,
   wherein the smartcard and smartcard reader are part of the smartcardreader class; and
   triggering the driver to modify or queue a smartcard request status.

5. The method of claim 4, wherein the driver is a filter driver or a reader driver.

6. The method of claim 4, wherein the driver queues the smartcard request status and issues a second smartcard request to the reader service.

7. The method of claim 4, further comprising:
   instantiating a smartcard plug and play service, wherein the smartcard plug and play service initiates the triggering of the driver to modify the smartcard request status.

8. The method of claim 7, wherein the smartcard request status is modified to a completed status.

9. The method of claim 4, further comprising:
   instantiating a smartcard service, wherein the smartcard service triggers the driver to modify the smartcard request status.

10. The method of claim 4, further comprising:
    installing drivers for the smartcard using an operating system plug and play framework.

11. The method of claim 10 further comprising:
    communicating automatically with a third-party to allow automatic retrieval and installation of the drivers.

12. The method of claim 4, further comprising:
    determining that the smartcard must be removed and reinstalled to complete installation in the operating system and triggering the driver to modify the smartcard request status.

13. The method of claim 4, wherein instantiation is executed on a processor coupled to a computer readable storage media.

14. A system configured to simulate smartcard removal and reinsertion in a smartcard reader, the system comprising:
    a smartcard reader coupled to a reader driver and configured to establish connection with a smartcard; and
    a filter driver or a reader driver coupled to the smartcard reader and configured to modify a smartcard request status such that the smartcard appears to the operating system to have been removed.

15. The system of claim 14, wherein the filter driver triggers a smartcard plug and play service to install one or more drivers.

16. The system of claim 15 further comprising:
    a third-party update service coupled to the smartcard plug and play service and configured to communicate with a third-party to allow automatic retrieval and installation of the software.

17. The system of claim 14, further comprising:
    a smartcard service, wherein the smartcard service is configured to trigger the filter driver to modify the smartcard request status.

18. The system of claim 14, further comprising:
    a smartcard service discovering the smartcard present in the smartcard reader.

19. The system of claim 14, wherein the system is configured to simulate momentary removal of the smartcard.

20. The system of claim 14, further comprising:
    a smartcard plug and play service or operating system plug and play framework configured to:
       determine that a smartcard is not fully installed in the operating system; and
       trigger the filter driver to modify the smartcard request status.

* * * * *